Nov. 21, 1950 W. E. ELWELL 2,531,327
PROCESS FOR THE PRODUCTION OF VINYL XYLENES
Filed July 1, 1948
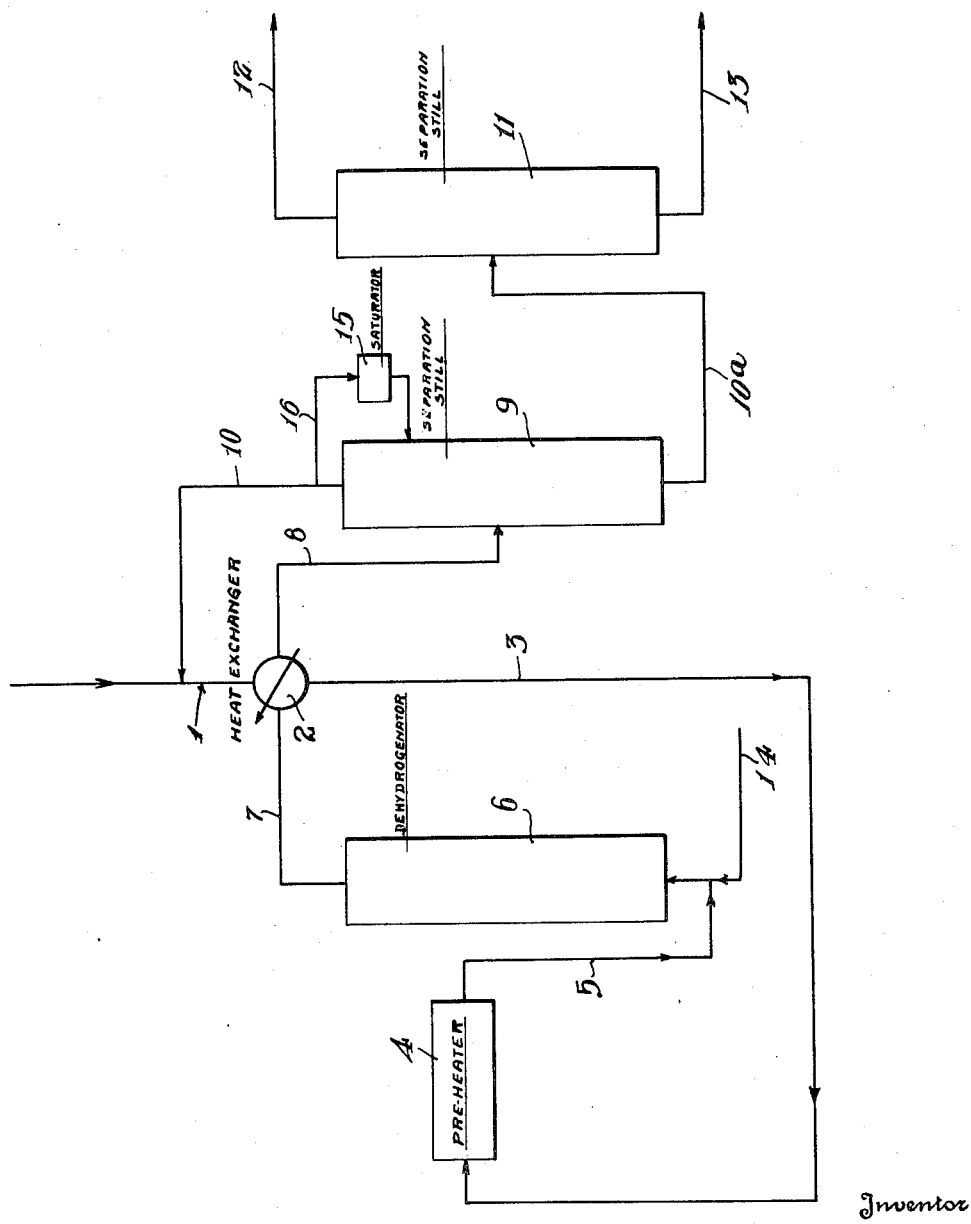
Inventor
William E. Elwell
By
attorneys Patented Nov. 21, 1950

2,531,327

UNITED STATES PATENT OFFICE 2,531,327

PROCESS FOR THE PRODUCTION OF VINYL XYLENES

William E. Elwell, Berkeley, Calif., assignor to California Research Corporation, San Francisco, Calif., a corporation of Delaware Application July 1, 1948, Serial No. 36,355

8 Claims. (Cl. 260—669)

This invention relates to a process of producing vinyl xylenes and vinyl toluenes by the dehydrogenation of the corresponding ethyl xylenes and toluenes, and refers particularly to a process of producing either meta or para vinyl toluenes, or the 3,5-dimethyl 1-vinyl benzene or the 3,4-dimethyl 1-vinyl benzene.

It is a general object of the present invention to produce plastic material analogous to styrene plastics having, however, a higher melting point. Normally styrene plastics, or polymerized vinyl benzene, have a heat distortion point (ASTM D648-41T) of around 80° C. There is considerable utility for similar plastic materials having higher heat distortion points. Polymerized vinyl toluenes have heat distortion points of around 90° C. while polymerized vinyl xylenes have heat distortion points of about 100° to 110° C. Heretofore, however, it has not been possible to produce polymers of vinyl toluenes and vinyl xylenes having such high heat distortion points by the dehydrogenation of the corresponding ethyl toluene and xylene compounds.

Of primary importance to the present invention is the discovery of certain reactions which take place during the dehydrogenation of ethyl toluene and xylene compounds, which reactions, unless avoided, necessarily result in the plastic vinyl polymers derived therefrom having low melting points or heat distortion points. It has been discovered that upon dehydrogenation of certain ethyl toluenes and ethyl xylenes there is produced indenes and methyl indenes, which products appearing in the reaction product act as plasticizers and reduce the molecular weight of the desired vinyl products. These indene products, when formed during the process of producing the desired vinyl products, possess boiling point characteristics so that their separation from the desired vinyl products by known processes, such as fractional distillation, appears virtually impossible, at least from a commercial standpoint. It has therefore been found that a prerequisite to the production of vinyl toluenes and vinyl xylene products of high heat distortion points is the avoidance of such indene and methyl indene production during the dehydrogenation of the ethyl compounds to the vinyl compounds.

It has been further found that this production of indene and methyl indene on the dehydrogenation of ethyl toluene and ethyl xylene takes place only where the ethyl compounds undergoing dehydrogenation possess a methyl group adjacent or ortho to the ethyl group. That is to say, indene is produced on the dehydrogenation of ethyl toluene only when the feed material contains the ortho ethyl toluene, whereas, methyl indenes are produced on dehydrogenation of ethyl xylenes whenever the feed material contains either the 2,3-dimethyl 1-ethyl benzene, the 2,4-dimethyl 1-ethyl benzene, the 2,5-dimethyl 1-ethyl benzene, or the 2,6-dimethyl 1-ethyl benzene. It is believed that the formation of these indene products occurs in accordance with the following reactions. The ethyl compound is first dehydrogenated to the corresponding vinyl compound as illustrated, for example, in the following equation, which illustrates the dehydrogenation of 2,5-dimethyl 1-ethyl benzene to the 2,5-dimethyl 1-vinyl benzene product.

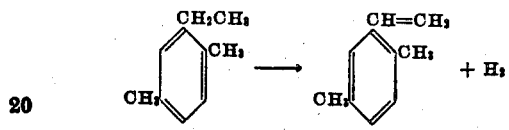

Thereafter, by a further cross-dehydrogenation between the vinyl group and the adjacent methyl group, there is produced a methyl indene in accordance with the following equation:

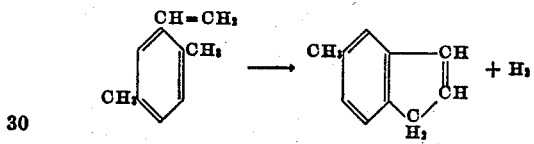

It has been found that if the ethyl product which is to undergo dehydrogenation to produce the corresponding vinyl product consists of one only of the following compounds, a desired vinyl polymer product can be produced free of indenes and having high heat distortion points. The useable ethyl compounds are the meta and para ethyl toluene and the 3,4-dimethyl 1-ethyl benzene or the 3,5-dimethyl 1-ethyl benzene. By the use of material selected from the above list and the proper dehydrogenation conditions I have successfully produced high melting point vinyl plastic products. It is, however, further necessary that the feed stock contain only a single ethyl toluene or ethyl xylene. When attempts are made to produce vinyl toluenes and vinyl xylenes by the dehydrogenation of mono-ethyl toluenes and mono-ethyl xylenes it will be found virtually impossible to separate the produced vinyl compounds from the unreacted ethyl compounds. This difficulty arises partially from the fact that the boiling points of the desired vinyl products and the unreacted ethyl compounds closely correspond, but also arises from the fact that extreme difficulty arises in preventing polymerization of the vinyl products during the separation procedure. In the process of the present invention these difficulties have been overcome by the joint use of vacuum distillation, steam distillation and sulfur compounds to prevent polymerization provided only a single ethyl product is contained in the feed to the dehydrogenation process. Where, for example, both the 3,5-dimethyl 1-ethyl benzene and the 3,4-dimethyl 1-ethyl benzene are fed to a common dehydrogenation operation, it is virtually impossible to separate the produced vinyl products from the unreacted ethyl compounds.

Processes producing ethyl toluenes and xylenes have normally resulted in the production of products containing a number of isomers. Such products are not believed suitable sources of material for dehydrogenation to produce the desired vinyl products. Such a mixture of ethyl compounds would, as a general rule, result in the production of indenes. Moreover, if, for example, only the two isomers, 3,5-dimethyl 1-ethyl benzene and 3,4-dimethyl 1-ethyl benzene, were employed, which do not yield indenes on dehydrogenation, separation of the vinyl material from the unreacted ethyl xylenes is virtually impossible. The following tabulation gives the approximate boiling points of these materials and their products.

| | Boiling point, °C. |
|---|---|
| 3,5 dimethyl 1-ethyl benzene | 184 |
| 3,5-dimethyl 1-vinyl benzene | 192 |
| 3,4-dimethyl 1-ethyl benzene | 189 |
| 3,4-dimethyl 1-vinyl benzene | 197 |

From the above tabulation it appears that there exists about an 8° C. differential in the boiling points of the ethyl and their vinyl products, but where all four products are present in a reaction mixture there exists only a 3° C. differential between some of the components, which differential is too small to allow separation in a practical manner by fractional distillation.

The process of the present invention will be fully understood from the following description of a preferred example of the invention as given in connection with the accompanying drawings.

In the drawings the figure represents a diagrammatic view of a suitable apparatus in which the process of the present invention may be conducted. In the drawings, however, for the sake of clarity and simplicity, there have been omitted certain details such as pumps, valves and measuring means, heat exchangers, coolers, refluxing apparatus, flow meters and like appurtenances, as will be readily supplied by one skilled in the art.

The ethyl xylene or toluene material to be dehydrogenated is taken from a source and passed through line 1 through a heat exchanger 2. From the heat exchanger 2 the ethyl toluene or xylene is passed through line 3 to a preheater 4, from which the ethyl toluene or xylene is passed by line 5 to a dehydrogenator 6. From the dehydrogenator 6 the products of the reaction, including any unreacted toluene or xylene, is passed through line 7 through the heat exchanger 2, from which the reaction products are passed through line 8 into a separation still 9. From the separation still 9 the unreacted ethyl toluene or xylene is taken from line 10 and recycled to the dehydrogenator 6 by joining the ethyl xylene entering in line 1. From the bottom of the separation still 9 the vinyl xylene and any tar produced in the process is taken through line 10ª and enters a second separation still 11, from which the desired vinyl product is separated from the upper end through line 12 and from which the produced tar is drawn from the bottom through line 13.

In operation of the process any usual dehydrogenation catalyst may be employed in the dehydrogenator 6 with appropriate modifications in the design and operation of the dehydrogenator to meet specific requirements of the catalyst used. Examples of such a usual dehydrogenation catalyst are the Houdry type "R" catalyst consisting of about 10% chromium oxide $Cr_2O_3$ on an alumina $Al_2O_3$ support. Other catalysts consist essentially of chromium phosphate on any suitable inert support or the so-called iron catalyst, which are mixtures of iron oxide $Fe_2O_3$, potash $K_2O$, and magnesium oxide $MgO$.

When the chromium oxide catalyst is employed the ethyl toluene or xylene to be dehydrogenated is preferably raised to a temperature of around 1000° F. to 1150° F. in the preheater 4. In the other catalysts, such as iron catalyst, the ethyl material to be dehydrogenated may be, for example, raised to a temperature of 900°–1000° F. in the preheater 4. With the chromium oxide catalyst the temperature of dehydrogenation in the dehydrogenator 6 is maintained within the temperature range of 1000° to 1150° F., whereas, with the other catalysts mentioned a reaction temperature of about 1150°–1300° F. is maintained in the dehydrogenator 6.

With the chromium oxide catalyst a vacuum is normally employed in the dehydrogenator corresponding to about 5 in. Hg absolute, whereas atmospheric pressure is commonly employed with the other catalysts mentioned. With the iron oxide catalysts steam should be supplied to the dehydrogenator 6, for example, entering with the ethyl toluene and xylene by being supplied through a line 14. A proper proportion of steam to ethyl toluene or xylene is about 2.6 to 1 weight ratio, and a suitable temperature for the entering steam is 1200°–1350° F.

A conversion of about 15 to 35 per cent of the ethyl toluene or xylene to the corresponding vinyl toluene or xylene occurs in each path through the dehydrogenation apparatus. In operation of the process, using the chromium oxide catalyst, the usual practice is followed of interrupting the dehydrogenation procedure whenever about 1 to 5 per cent of coke has been deposited in the dehydrogenator and introducing air or oxygen in the dehydrogenator to burn part of the produced coke and at the same time elevate the temperature. Normally, runs of about 15 minutes are employed followed by blowing the air, and during the step of blowing the air the temperature within the dehydrogenator is elevated about 25° to 75° F.

The product is taken from the dehydrogenator and rapidly cooled in the heat exchanger 2 to about 50° C. From the heat exchanger 2 the unreacted ethyl toluene or xylene and the corresponding vinyl product is introduced into the separation still 9, wherein it is subjected to steam distillation under vacuum. The temperature of distillation is preferably around 75° to 90° C. Steam is added in the ratio of 2 to 5 parts by weight of steam to 1 part of hydrocarbon undergoing distillation. In the case of the production of vinyl xylenes the separation still 9 will require about 60 to 90 plates in the separating column in order to effect the separation of the unreacted ethyl material from the produced vinyl compound. The distillation column should be maintained under a vacuum corresponding to about 200 to 500 mm. Hg at the top of the column in order to be able to effect the desired separation at the temperature range of 75° to 90° C. In order to prevent polymerization of the vinyl compound in this operation the system should be maintained saturated with sulphur, which acts as an inhibitor as to inhibit the polymerization of vinyl products. For this purpose I have indicated a saturator 15, which may be utilized in a recycled line 16 through which hydrocarbon material is circulated to maintain sulphur saturation of the separation still in column 9.

In the final distillation unit 11, wherein the vinyl product is separated from tar, likewise a temperature of operation of about 75° to 90° C. is maintained, and pressure and steam distillation combined in order to effect the vaporization and separation at the desired low temperature. The conditions of vacuum and ratio of steam to hydrocarbons may be substantially the same as in the case of the distillation column 9. However, in the distillation unit 11 a lesser number of plates, such, for example, as 25 plates, will be required for effecting vapor separation of the vinyl product from the tar material.

The following examples of the operation of the process will illustrate the necessity for the elimination or prevention of indene production if a desired high heat distortion point product is to be produced. When the ethyl xylene fed to the process consisted of 98 per cent of 2,5-dimethyl 1-ethyl benzene it was found that the vinyl xylene product contained a methyl indene, the ratio of methyl indene to vinyl xylene in the product varying from 0.11 to 0.21 depending on the temperature of dehydrogenation, the larger ratios of indene to vinyl compound occurring at the higher temperatures as the temperature was varied from 1040° to 1120° F. When the ethyl xylene fed to the process consisted of 65% 2,4-dimethyl 1-ethyl benzene, 25% 2,6-dimethyl 1-ethyl benzene, and 10% 3,5-dimethyl 1-ethyl benzene, and temperatures of operation from 1030° to 1118° were employed, it was found that the product of the process contained a ratio of methyl indene to vinyl xylene of from 0.17 to 0.33, again the higher ratio of indene to vinyl material being produced at the higher temperatures.

Such operations do not produce vinyl products of desirable high heat distortion point, but sufficient indene is formed along with the vinyl product as to plasticize the same to materials of low melting point. When, however, the ethyl compound to be dehydrogenated consisted of 85% of 3,5-dimethyl 1-ethyl benzene, with only 15% of the 2,5- or 2,4-dimethyl 1-ethyl benzene, the vinyl xylene was produced at a dehydrogenation temperature of 1018° F., which contained less than 0.01 ratio of methyl indene to vinyl xylene. Likewise, when the ethyl xylene fed to the dehydrogenation unit consisted of 85% of the 3,4-dimethyl 1-ethyl benzene, the remainder being mainly the 2,3-dimethyl 1-ethyl benzene, and the dehydrogenation was carried out at a temperature of 1060° F., the product of the process at a ratio of methyl indenes to vinyl xylenes was only 0.03.

Investigation of the effect of methyl indenes on vinyl xylene polymers has shown that with as little as about 1.5% of methyl indene the hardness of the polymer at an elevated temperature, such, for example, as 100° C., appears to be effected; that when as little as 6% of methyl indene is present the polymerized vinyl xylene is soft; and with higher percentages it becomes fluid at low temperatures, such, for example, as 25° C. About 1.5 to 2% is a maximum tolerable limit for indenes in vinyl xylene polymers if products of high melting point are desired, and for certain purposes even lower tolerances may be found desirable. The ethyl xylene fed to the dehydrogenation operation should therefore contain not over about 15 to 20% of any of the ethyl xylenes which have a methyl group adjacent the ethyl group. However, if the feed material to the dehydrogenation process consists of 80 to 85%, or higher, of either meta toluene, para toluene, 3,4-dimethyl 1-ethyl benzene or 3,5-dimethyl 1-ethyl benzene, I have found that vinyl products sufficiently free of indene formation can be produced so as to yield polymers of high heat distortion point.

While the foregoing examples were from operations of the process using the Houdry type catalyst or chromium oxide on alumina, substantially similar results in so far as production of indenes and the avoidance of indenes during the process are obtained with other known dehydrogenation catalysts including those specifically above-mentioned. The process of the invention is not dependent, therefore, on the use of any specific catalyst.

While the specific examples of the process herein described are well adapted to carry out the objects of the invention it will be understood by those skilled in the art that many modifications and variations of the invention may be made without departing from the spirit and scope thereof, and this invention is of the scope set forth in the appended claims.

I claim:

1. The method of producing methyl and dimethyl vinyl benzenes polymerizable to vinyl benzene polymers having heat distortion points in excess of 80° C. by catalytic dehydrogenation of orthoethyltoluene and ethyl xylenes having a methyl group in ortho relationship to the ethyl group which comprises catalytically dehydrogenating one part by weight of a material from the group consisting of orthoethyltoluene, 2,3-dimethyl 1-ethylbenzene, 2,4-dimethyl 1-ethylbenzene, 2,5-dimethyl 1-ethylbenzene and 2,6-dimethyl 1-ethylbenzene together with at least four parts by weight of an isomer of at least one member of said group having only meta and para relationships between its methyl and ethyl groups.

2. The method as defined in claim 1, wherein the material employed in the amount of one part by weight is orthoethyltoluene.

3. The method as defined in claim 1, wherein the material employed in the amount of one part by weight is an ethylxylene having at least one of its methyl groups in ortho relationship to the ethyl group.

4. The method as defined in claim 1, wherein the dehydrogenation catalyst is a chromium catalyst.

5. The method of catalytically dehydrogenating a poly-alkyl substituted benzene of the group consisting of orthoethyltoluene, 2,3-dimethyl 1-ethylbenzene, 2,4-dimethyl 1-ethylbenzene, 2,5-dimethyl 1-ethylbenzene and 2,6-dimethyl 1-ethylbenzene without appreciable simultaneous production of indenes which comprises dehydrogenating one part of said polyalkyl substituted benzene by contacting it with a dehydrogenation catalyst at a temperature in the range about 1000-1300° F. in the presence of at least four parts of at least one material of the group consisting of paraethyltoluene, metaethyltoluene, 1-ethyl 3,4-dimethylbenzene, and 1-ethyl 3,5-dimethylbenzene.

6. The method as defined in claim 5, wherein the material employed in the amount of one part by weight is orthoethyltoluene.

7. The method as defined in claim 5, wherein the material employed in the amount of one part by weight is an ethylxylene having at least one of its methyl groups in ortho relationship to the ethyl group.

8. The method as defined in claim 5, wherein the dehydrogenation catalyst is a chromium catalyst.

WILLIAM E. ELWELL.

REFERENCES CITED

The following references are of record in the file of this patent:

UNITED STATES PATENTS

| Number | Name | Date |
| --- | --- | --- |
| 1,541,175 | Ostromislensky et al. | June 9, 1925 |
| 1,552,874 | Ostromislensky et al. | Sept. 8, 1925 |
| 2,188,772 | Dreisbach et al. | Jan. 30, 1940 |
| 2,443,217 | Amos et al. | June 15, 1948 |